United States Patent [19]

Schalk

[11] Patent Number: 4,782,411

[45] Date of Patent: Nov. 1, 1988

[54] COUPLING DEVICE FOR TRANSMITTING AXIAL MOVEMENT TO A ROTATABLE BODY

[75] Inventor: Adelbert Schalk, Furtwangen, Fed. Rep. of Germany

[73] Assignee: Deutsche-Thomson-Brandt GmbH, Villengen-Schwenningen, Fed. Rep. of Germany

[21] Appl. No.: 18,497

[22] Filed: Feb. 25, 1987

[30] Foreign Application Priority Data

Feb. 25, 1986 [DE] Fed. Rep. of Germany ....... 3606012

[51] Int. Cl.$^4$ .......................... G11B 5/52; G11B 15/60
[52] U.S. Cl. ...................................... 360/107; 310/105
[58] Field of Search .......................... 360/107, 84–85, 360/95; 310/105, 106

[56] References Cited

U.S. PATENT DOCUMENTS

| | | | |
|---|---|---|---|
| 4,408,239 | 10/1983 | Ushiro | 360/107 |
| 4,446,392 | 5/1984 | Jaeschke | 310/105 |
| 4,603,359 | 7/1986 | Narasawa et al. | 360/84 |
| 4,611,255 | 9/1986 | Ushiro et al. | 360/84 |

Primary Examiner—John H. Wolfe
Attorney, Agent, or Firm—Spencer & Frank

[57] ABSTRACT

A coupling device for the transmission of an axial movement from a lift generator to a rotatable, axially movable body, composed of: a component creating a pressure-transmitting contact between the lift generator and the body; and a device including a magnet producing a magnetic field which creates a magnetic attraction force between the lift generator and the body.

8 Claims, 2 Drawing Sheets

COUPLING DEVICE FOR TRANSMITTING AXIAL MOVEMENT TO A ROTATABLE BODY

BACKGROUND OF THE INVENTION

Various types of couplings are known in the art for the transmission of direction changing longitudinal movements to rotating bodies, in which the longitudinal movement, e.g. a Lifting movement, is transmitted by members that are in engagement. A simple example of this is a lever which engages in a circumferential groove of a rotating, longitudinally movable body and which is movable in the axial direction to cause the rotating body to undergo an axial movement.

To reduce friction between the moving parts, slide or ball bearings may be connected therebetween. However, couplings, in which a plurality of mechanical parts, such as, for example, levers, are in engagement with one another, have a certain amount of play and friction that cannot be neglected. If the longitudinal movement that is to be transferred to a rotating body is oriented centrally in the axial direction, errors of alignment between the lift generator and the rotating body may occur due to mechanical overdefinition. The term mechanical overdefinition means that the number of points for contact or supporting is higher than necessary so that the position between the lift generator and the rotating body may be not exactly defined.

SUMMARY OF THE INVENTION

It is an object of the present invention to provide a coupling which transfers a lifting movement to a rotating body without play and with low friction in the direction of the axis of rotation of that body.

The above and other objects are achieved, according to the invention, by a coupling device for the transmission of an axial movement from a lift generator to a rotatable, axially movable body, comprising: means creating a pressure-transmitting contact between the lift generator and the body; and means including a magnet producing a magnetic field which creates a magnetic attraction force between the lift generator and the body.

Basically, the invention resides in that the coupling is produced by magnetic field lines, with the mechanical force lock being generated by way of a preferably point-shaped contact between the lift generator and the rotating body.

DESCRIPTION OF THE PREFERRED EMBODIMENTS

Figure 1:
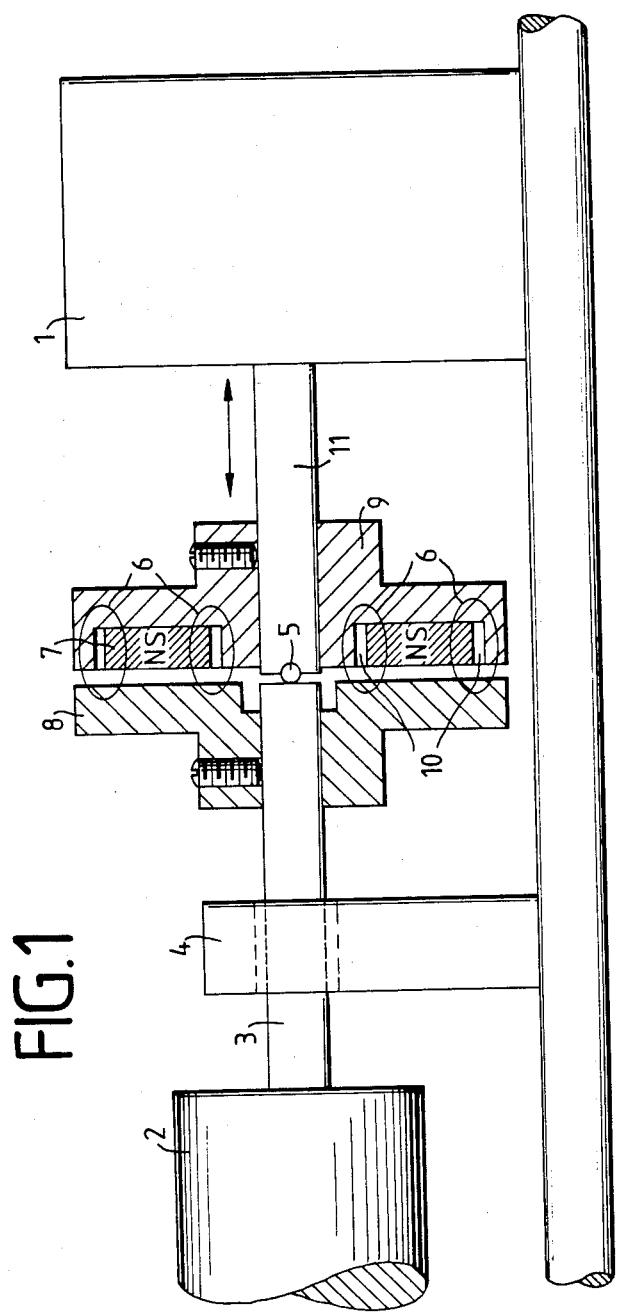
FIG. 1 is an elevational partly cross-sectional view of a preferred embodiment of a coupling device according to the invention, FIG. 2 a modified embodiment of the contact between the lift generator and the rotating body, FIG. 3 a futher embodiment of the contact between the lift generator and the rotating body and FIG. 4 a modified arrangement of the magnets within the lift generator.

FIG. 1 is a partial cross-sectional view of a coupling disposed between a lift generator 1 and a rotating body 2 having an axial shaft, or spindle 3 rotatably mounted in a stationary bearing 4 so as to be displaceable in the lifting direction, i.e. along the axis of rotation. The lifting direction is indicated by a double-headed arrow.

Lift generator 1 and spindle 3 are connected with one another in an axial pressure transmitting manner by way of a ball 5 secured to shaft 11.

Contact between ball 5 and axially displaceable rotating body 2 is established by a magnetic field, with characteristic magnetic field lines 6, between an annular magnet 7 and a magnetizable plate 8 made, for example, of soft iron. Annular magnet 7 is fastened on a mount 9 made, for example, also of soft iron and providing magnetic field return paths. To obtain the optimum field line paths between magnet 7 and plate 8, non-magnetizable annular zones 10 are provided in mount 9 so as to radially bound magnet 7. These zones are composed, for example, of plastic rings whose thickness is greater than the length of the axial air gap between magnet 7 and plate 8. Lift generator 1 itself may be a rotating or also a stationary unit. Preferably, the magnetic field is essentially axial between magnet 7 and plate 8. Thus, the magnetic field will not influence the rotation of body 2.

A lifting movement can be effected in any known manner such as, for example, by an electromagnetic transducer in the form of a moving coil, by a motor drive, or by a magneto-strictive pickup.

Ball 5 obviates the need for accurate alignment between lift generator 1 and spindle 3, since the load imposed by spindle 3 on its support bearings is not adversely influenced by the force applied by ball 5. Ball 5 will continue to exert an essentially axial force.

In place of ball 5, one of spindle 3 and shaft 11 can be given a conical tip. It is then also possible to simultaneously make this tip a bearing member for spindle 3.

The lifting movement itself can be transferred in both axial directions, completely without play, by the magnetic attraction between magnet 7 and plate 8. It must of course be adapted to the forces to be transferred in the pulling direction by proper selection of the magnets, dimensions of the plate as well as configuration of the air gap between the two parts.

It is immaterial in such an arrangement on which part the coupling magnet 7 or magnetizable plate 8 is arranged.

Preferably, the present invention can be utilized for controlling the lifting movement of the head drum in a magnetic tape recorder used to record data.

Figure 2:
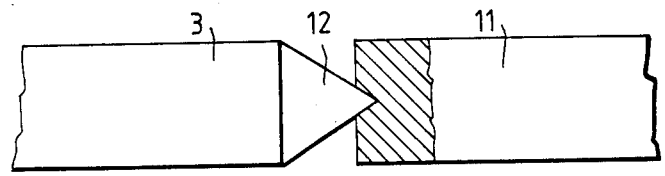

In FIG. 2 the pressure-transmitting contact between spindle 3 and shaft 11 is performed by a conical tip 12 of spindle 3 which engages the end of shaft 11. Spindle 3 rotates whereas shaft 11 may rotate or not.

Figure 3:
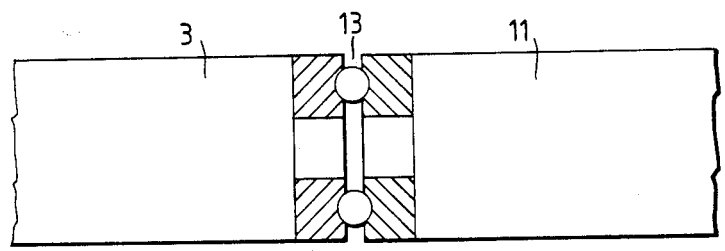

FIG. 3 shows an embodiment wherein the contact between spindle 3 and shaft 11 is made by an axial ball bearing 13.

Figure 4:
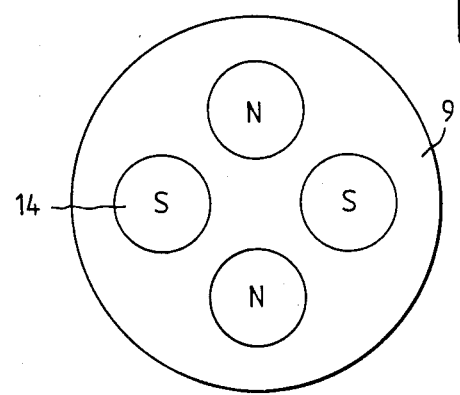

FIG. 4 is an axial view upon the mount 9 from the left side in FIG. 1. Instead of the magnet 7 of FIG. 1 a plurality of magnets 14 is arranged in one plane symmetrically to the axis of rotation of the mount 9', the magnets 14 being oppositely polarized.

The invention now being fully described, it will be apparent to one of ordinary skill in the art that many changes and modifications can be made thereto without departing from the spirit or scope of the invention as set forth herein.

The present disclosure relates to the subject matter disclosed in German Application No. P 36 06 012.7 of Feb. 25th, 1986, the entire specification of which is incorporated herein by reference.

What is claimed is:

1. Coupling device for the transmission of an axial movement from a lift generator to a rotatable, axially movable body comprising: means creating a pressure-transmitting contact between the lift generator and the body; and means including a magnet producing a magnetic field which creates a magnetic attraction force between the lift generator and the body.

2. Coupling device as defined in claim 1, wherein said means creating a pressure-transmitting contact comprise a ball.

3. Coupling device as defined in claim 1, wherein said means defining a pressure-transmitting contact comprise a shaft having a conical tip.

4. Coupling device as defined in claim 1, wherein said means defining a pressure-transmitting contact comprise a bearing.

5. Coupling device as defined in claim 1, wherein said magnet is a ring magnet which is arranged symmetrically to the axis of rotation of the body.

6. Coupling device as defined in claim 1, wherein said means including a magnet comprises a plurality of magnets arranged in one plane symmetrically to the axis of rotation of the body.

7. Coupling device as defined in claim 1, wherein said means including a magnet comprise a magnetizable plate spaced from said magnet by an air gap to provide a path for the magnetic field produced by said magnet, said magnet and said plate being connected to respective ones of the lift generator and movable body.

8. Coupling device as defined in claim 1, wherein the body is the head drum of a magnetic tape recorder.

* * * * *